Patented Feb. 23, 1943

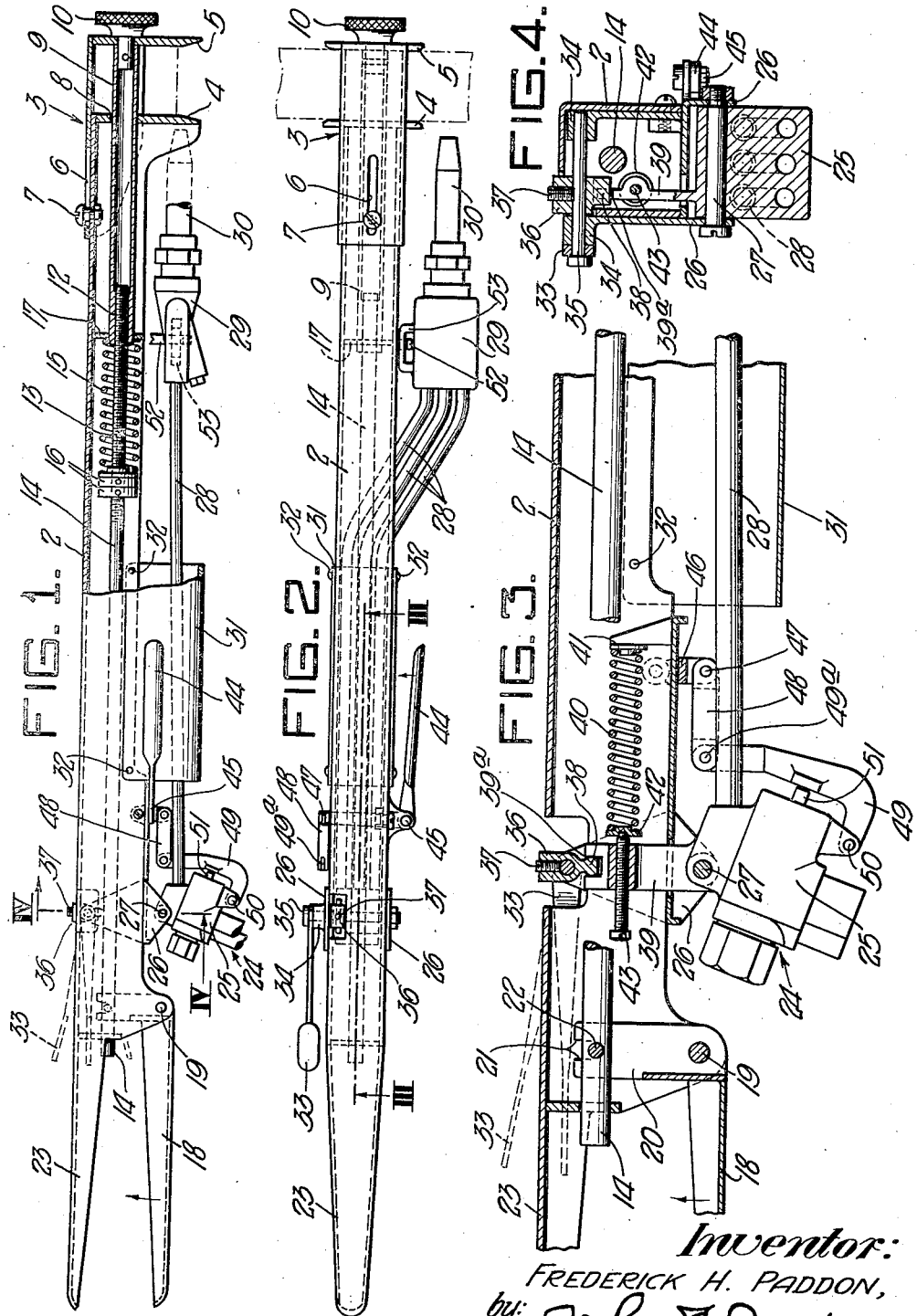

2,312,120

UNITED STATES PATENT OFFICE 2,312,120

APPARATUS FOR CUTTING METALLIC MATERIAL

Frederick H. Paddon, Youngstown, Ohio

Application September 20, 1941, Serial No. 411,748

10 Claims. (Cl. 266—23)

This invention relates to the cutting of metallic material by means of a cutting torch or burner and, particularly, to an improved apparatus or means incorporated with the cutting torch for holding the material to be cut.

It is sometimes desirable to provide means for securely holding the material or article which is to be cut by the flame of a cutting torch, usually an oxy-acetylene torch, particularly if the material to be cut has a relatively small cross-section. This is particularly so when it is desired to cut the crop end from coils of metallic material during the manufacture of metallic strip material in the steel industry. Accordingly, the present invention relates to a means or apparatus for holding the metallic material to be cut while the same is being cut by a cutting torch or burner.

It is the general object of the present invention to provide a clamping mechanism for holding the material to be cut, with means arranged in combination therewith for manipulating the cutting torch associated therewith so as to move the same relative to the clamping mechanism and the material to be cut, which material is adapted to be held thereby.

It is also an object of this invention to provide a clamping mechanism for holding the material to be cut with a cutting torch arranged in combination therewith for cutting the same, whereby a clean cut is obtained with the use thereof, and at the same time a severance of the material which provides relatively square and true end surfaces.

It is another object of the invention to provide apparatus or means including, in combination, a clamping means for holding the material to be cut and a cutting torch movable relative thereto which is simple and inexpensive and, at the same time, apparatus which is strong and rugged in its construction.

It is a further object of this invention to provide apparatus for cutting metallic material by means of a cutting torch, including means for securely holding the material to be cut which is easy and convenient to use, as well as efficient and effective in its use.

Various other objects and advantages of this invention will become more apparent during the course of the following specification and will be particularly pointed out in the appended claims.

In the accompanying drawing there is shown, for the purpose of illustration, one embodiment which my invention may assume in practice.

In this drawing:

Figure 1 is a side elevation, partly in section, of the improved cutting apparatus of my invention;

Figure 2 is a plan view of Figure 1;

Figure 3 is an enlarged sectional view taken on line III—III of Figure 2; and

Figure 4 is an enlarged sectional view taken on line IV—IV of Figure 1.

Referring more particularly to the drawing, the improved apparatus of my invention comprises a longitudinally extending metallic body member or frame 2 preferably having an inverted U-shaped cross-section. There is arranged at one end of the body member 2 a clamping means 3 consisting of a stationary jaw 4 and a movable jaw 5 which cooperates therewith to hold the material to be cut. The movable jaw 5 consists preferably of an angle iron member with a slot 6 arranged in the top side thereof in which there is disposed a screw 7 carried by the body member 2 for retaining and guiding the movable jaw 5 in its reciprocable movement on the end of the body member.

As is shown in Figure 1 of the drawing, there is positioned in a hole 8 arranged in the end of the body member 2 above the stationary jaw 4 carried thereby preferably a tubular member or pipe 9 having the inner end thereof extending into and disposed within the body member. The outer end of the tubular member 9 is connected preferably to a knurled adjusting knob 10 extending through and carried by the movable jaw 5. The inner end of the tubular member 9 is interiorly threaded as at 12 and connected to a threaded portion 13 arranged on the outer end of a longitudinally extending rod 14 which is preferably positioned within the body member 2 extending throughout substantially the length thereof. There is disposed around the threaded portion 13 of the rod 14, a compression coil spring 15 with one end thereof abutting against a pair of adjusting nuts 16 carried by the threaded portion 13 of the rod and with the other end of the spring abutting against a flange portion 17 carried by the interior of the body member.

At the opposite end of the body member 2 from the clamping means 3, preferably at the lower side thereof, there is mounted a handle member 18 which is pivotally attached to the body member as at 19. There is integrally arranged with the handle member 18 preferably a pair of spaced apart arm portions 20 which extend upwardly into the body member. The upper ends of the arm portions 20 preferably have slots 21 arranged therein in which there is disposed a transversely extending pin 22 carried by the inner end of the rod 14. The inner end of the body member 2 has a handle portion 23 integrally arranged therewith which is disposed directly opposite the pivotally arranged handle member 18 carried thereby.

Thus, it will be seen that the movable jaw 5 can be moved relative to the stationary jaw 4 with which it cooperates by firmly gripping the handle portion 23 of the body member together with the handle member 18 and forcing them together, through the action of the rod 14 and the tubular member 9, which are moved upon any movement of the handle member 18. It is the purpose of the spring 15 to urge the movable clamping jaw 5 at all times toward the stationary jaw 4 so that the material to be clamped and cut is yieldably held thereby. It will be seen that any outward movement of the rod 14 and the tubular member 9 is done against the action of the spring 15, which movement tends to load the same. The degree of compression of the spring 15 or clamping pressure may be adjusted by turning the adjusting nuts 16 on the rod 14. To clamp various size bars or stock, the tubular member 9 is turned on the rod 14 by means of the knurled knob 10 arranged on the outer side of the movable jaw 5 so that the same may be adjusted relative to the stationary jaw 4 and, at the same time, maintain a constant pressure on the spring 15.

There is arranged preferably forwardly of the handle member 18 on the bottom side of the body member 2 an oxygen-acetylene burner or torch 24 having a mixing valve 25 which is pivotally attached preferably to a pair of downwardly extending spaced apart lugs 26 carried by the body member by means of a pin 27. The mixing valve 25 is connected to a suitable source of gas and oxygen supply (not shown). Extending outwardly from the mixing valve 25 substantially parallel to the body member 2 and positioned therebelow, there is provided a plurality of longitudinally extending gas and oxygen carrying tubes 28 with the outer ends thereof preferably offset and arranged to one side of the clamping means 3, as shown in Figure 2 of the drawing, so as not to interfere with the clamping means in use. There is mounted on the extreme outer end of the tubes 28 a cutting head or mixing chamber 29 and a torch or cutting tip 30. Intermediate the length of the body member 2, preferably on the lower side thereof, there is provided a hand grip 31 which has substantially a U-shaped cross-section through which the tubes 28 extend and which is attached to the body member preferably by means of a plurality of machine screws 32.

There is positioned to one side of the body member 2, preferably a thumb lever 33 which is suitably journaled in a pair of spaced apart lugs 34 carried by the body member by means of a rotatable stud shaft 35. There is carried by the shaft 35 a collar-like member 36 which is secured thereto preferably by means of a set screw 37. There is integrally arranged with the member 36 a downwardly extending ball-like portion 38 which is disposed in a slot or socket 39ª arranged in the upper end of an upwardly extending arm 39 integrally carried by the mixing valve 25 of the torch 24.

As more clearly shown in Figures 3 and 4 of the drawing, there is disposed within the body member 2 preferably a compression coil spring 40 having one end thereof abutting against an upwardly extending lug portion 41 carried by the body member with the other end thereof abutting against a seating member 42 arranged on the end of an adjusting screw 43 carried by the upwardly extending arm 39 of the mixing valve 25. It is the purpose of the spring 40 to counterbalance the mixing chamber or head 29 and the cutting tip 30. The degree of compression of the spring 40 may be adjusted by means of the adjusting screw 43.

A special blast control preferably is provided through an equalizing linkage and special valve depressor so that the blast control is possible independent of the torch movement. Such blast control consists of a hand lever 44 which is disposed preferably to one side of the body member 2 directly opposite the hand grip 31 carried thereby and pivotally connected to the body member as at 45. There is integrally arranged with the hand lever 44 an outwardly extending arm-like portion 46 which is pivotally connected at 47 to one end of a link member 48 which is arranged substantially parallel to the body member. The other end of the link member 48 is pivotally attached to one end of a valve depressing member 49 as at 49ª. The other end of the valve depressing member 49 is pivotally connected preferably to the lower side of the mixing valve 25 as at 50. The valve depressing member 49 is adapted to cooperate with the blast valve 51 of the mixing valve 25. It will be understood that when the hand lever 44 is forced toward the body member 2, the blast valve 51 of the mixing valve 25 will be opened due to the action of the linkage 48 and valve depressing member 49. There is a spring (not shown) associated with the valve 51 for maintaining the same normally in a closed position.

On the outer end of the body member 2 directly opposite the head or mixing chamber 29 of the torch 24 there is positioned a guiding pin or lug 52 which is adapted to lie in a U-shaped lug portion 53 arranged on the side of the head 29 with which it is adapted to cooperate to guide the head and cutting tip 30 in their reciprocable movement as will hereinafter be described.

The improved combined clamping mechanism and cutting torch of my invention are operated in the following manner. The movable jaw 5 is first adjusted relative to the stationary jaw 4 so that they are spaced the proper distance apart for clamping the particular bar or stock to be cut whereby the handle 18 together with the handle portion 23 of the body member is comfortable to the grip. The preheating flame of the torch or burner 24 is then properly adjusted in a well known manner. After the torch has been lighted and the flame adjusted to size, the apparatus is grasped with both hands by the operator, with one hand placed on the grip 31 with the fingers positioned over the blast lever 44 arranged on the side of the body member. The other hand is placed on the handle portion 23 on the outer end of the body member, with the fingers positioned opposite the handle member 18 arranged directly therebelow and with the thumb of this hand resting on the lever 33.

The handle member 18 is then depressed toward the handle portion 23 of the body member whereby the movable jaw 5 is moved outwardly from the end of the body member and away from the stationary jaw 4 against the action of the coil spring 15 thereby tending to load the same.

The clamping means 3 is then positioned over the bar or stock to be cut with the same positioned between the movable jaw 5 and the stationary jaw 4. The grip on the handle member 18 is then released thereby permitting the movable jaw 5 to move inwardly toward the stationary jaw 4 due to the action of the spring 15 so as to firmly clamp the bar or stock therebetween as shown in Figures 1 and 2 of the drawing.

The cutting tip 30 of the torch, if not already in proper position to preheat the bar or stock at the point at which the cut is to be made, is lowered into position by a slight pressure on the thumb lever 33. After the bar or stock has been properly preheated by the torch, the blast hand lever 44 is depressed by the other hand so that the proper cutting flame issues forth from the cutting tip 30. While the lever 44 is held in such depressed position against the body member, the thumb lever 33 is further depressed or manipulated so that the cutting tip 30 is moved relative to and transversely of the stock or bar and upwardly at the proper rate to properly cut the same by the flame whereby the bar or stock is severed. Upon completion of the cut, both the blast lever 44 and the thumb lever 33 are released, thereby shutting off the cutting flame and permitting the cutting tip 30 to return to its normal position, as shown in Figure 1 of the drawing, due to the weight of the head 29 and the tip 30, which are counter-balanced by the coil spring 40. The bar or stock is then released from the clamping means 3 by depressing the handle member 18.

As a result of my invention it will be seen that there is provided a simple and inexpensive apparatus which firmly grips and positions the bar or stock to be cut while the same is being cut by the flame of the cutting torch. It will also be seen that the improved cutting apparatus of the present invention is not only simple and convenient to use but one which is efficient and effective in its use whereby a uniform and clean cut is obtained.

While I have shown and described one specific embodiment of my invention, it will be understood that this embodiment is merely for the purpose of illustration and description and that various other forms may be devised within the scope of my invention, as defined in the appended claims.

I claim:

1. Apparatus of the class described, including a longitudinally extending body member, clamping means arranged on one end of said member for holding the material to be cut, a cutting torch movably mounted on said member which is adapted to be moved relative to said clamping means and the material adapted to be held thereby, and means arranged on the opposite end of said member for actuating said clamping means.

2. Apparatus of the class described, including a longitudinally extending body member, clamping means arranged on one end of said member for holding the material to be cut, a cutting torch pivotally mounted on said member intermediate the length thereof, means for moving said torch about its pivotal connection relative to said clamping means and the material adapted to be held thereby, and means arranged on the opposite end of said member for actuating said clamping means.

3. Apparatus of the class described, including a longitudinally extending body member, clamping means arranged on one end of said body member for holding the material to be cut, a cutting torch movably mounted on said body member intermediate the length thereof, means for moving said torch relative to said clamping means and the material adapted to be held thereby, means carried by said body member for controlling the flame of said cutting torch, and means arranged on the opposite end of said body member actuating said clamping means.

4. Apparatus of the class described, including a longitudinally extending body member, clamping means arranged on one end of said body member for holding the material to be cut, a cutting torch movably mounted on said body member, a handle member carried by said body member, means connecting said handle to said torch, said handle member adapted to move said cutting torch relative to said clamping means and the material adapted to be held thereby, a valve carried by said body member for controlling the flame of said cutting torch, an actuating member carried by said body member for actuating said valve, means connecting said actuating member to said valve, and means arranged on the opposite end of said body member for actuating said clamping means.

5. Apparatus of the class described, including a longitudinally extending body member, a clamping means arranged on one end of said body member consisting of a pair of jaws with one of said jaws being movable relative to the other, a reciprocably arranged member carried by said body member and extending substantially the length thereof, said reciprocable member being connected to said movable jaw which it is adapted to actuate, means for maintaining said jaws in their clamped position, means arranged on the opposite end of said body member which is connected to said reciprocable member for actuating said movable jaw, a cutting torch movably mounted on said body member, and means for moving said cutting torch relative to said clamping means and the material adapted to be held thereby.

6. Apparatus of the class described, including a longitudinally extending body member, a clamping means arranged on one end of said body member consisting of a pair of jaws with one of said jaws being movable relative to the other, a reciprocably arranged member carried by said body member and extending substantially the length thereof, said member being connected to said movable jaw which it is adapted to actuate, resilient means arranged with said member so as to tend to move said movable jaw toward the opposed jaw whereby the jaws are normally maintained in their clamping position, means arranged on the opposite end of said body member which is connected to said reciprocably arranged member for moving the same against the action of said resilient means so as to move said movable jaw to release the clamping action of the jaws, a cutting torch movably mounted on said body member, and means for moving said cutting torch relative to said clamping means and the material adapted to be held thereby.

7. Apparatus of the class described, including a longitudinally extending body member, clamping means arranged on one end of said body member for holding the material to be cut, a cutting torch pivotally mounted on said body member intermediate the length thereof, a pivotally mounted handle member carried by said body member, means connecting said handle to said cutting torch, said handle adapted to move said cutting torch relative to said clamping means and the material adapted to be held thereby, and means carried by said body member for actuating said clamping means.

8. Apparatus of the class described, as defined in claim 7, including resilient means for maintaining the cutting torch in and returning the same to one position.

9. Apparatus of the class described, as defined in claim 7, including means carried by said body member for controlling the flame of the cutting torch.

10. Apparatus of the class described, including a longitudinally extending body member, a clamping means arranged on one end of said body member for holding the material to be cut, means arranged on the opposite end of said body member for actuating said clamping means, a cutting torch movably mounted on said body member, means carried by said body member for moving said torch relative to said clamping means and the material adapted to be held thereby, a valve carried by said body member for controlling the flame of said torch, and means carried by said body member for actuating said valve.

FREDERICK H. PADDON.